United States Patent
Sato et al.

(10) Patent No.: US 11,456,629 B2
(45) Date of Patent: Sep. 27, 2022

(54) STATOR WITH DIVIDED CORES CONNECTED CIRCUMFERENTIALLY

(71) Applicant: KYOCERA INDUSTRIAL TOOLS CORPORATION, Hiroshima (JP)

(72) Inventors: Yoshinari Sato, Hiroshima (JP); Yoshimu Tanimoto, Hiroshima (JP); Kaoru Koga, Hiroshima (JP)

(73) Assignee: KYOCERA INDUSTRIAL TOOLS CORPORATION, Hiroshima (JP)

( * ) Notice: Subject to any disclaimer, the term of this patent is extended or adjusted under 35 U.S.C. 154(b) by 112 days.

(21) Appl. No.: 16/769,583

(22) PCT Filed: Nov. 28, 2018

(86) PCT No.: PCT/JP2018/043714
§ 371 (c)(1),
(2) Date: Jun. 4, 2020

(87) PCT Pub. No.: WO2019/111777
PCT Pub. Date: Jun. 13, 2019

(65) Prior Publication Data
US 2021/0119498 A1    Apr. 22, 2021

(30) Foreign Application Priority Data

Dec. 7, 2017  (JP) .............................. JP2017-234907
Dec. 7, 2017  (JP) .............................. JP2017-235136

(51) Int. Cl.
*H02K 1/14*    (2006.01)

(52) U.S. Cl.
CPC .................... *H02K 1/148* (2013.01)

(58) Field of Classification Search
CPC ............ H02K 1/148; H02K 1/12; H02K 1/14; H02K 1/141; H02K 1/143; H02K 1/145;
(Continued)

(56) References Cited

U.S. PATENT DOCUMENTS 5,786,651 A * 7/1998 Suzuki ................. H02K 15/022
                                                    310/216.009
5,859,486 A * 1/1999 Nakahara ............... H02K 1/148
                                                    310/216.084
(Continued)

FOREIGN PATENT DOCUMENTS

JP      2003102136 A      4/2003
JP      2009225652 A      10/2009
(Continued)

OTHER PUBLICATIONS

International Search Report in PCT Application No. PCT/JP2018/043714, dated Mar. 5, 2019, 4pp.

*Primary Examiner* — Maged M Almawri
(74) *Attorney, Agent, or Firm* — Hauptman Ham, LLP (57) ABSTRACT

A stator core is configured by assembling divided cores in an annular shape. Each core includes a yoke part extending in a circumferential direction, and having opposite first and second facing sections. The first facing section includes an inner circumferential protrusion, an outer circumferential protrusion, and a central recess. The second facing section includes an inner circumferential notch, an outer circumferential notch, and a central protrusion. When the cores are assembled, the inner circumferential protrusion faces the inner circumferential notch, the outer circumferential protrusion faces the outer circumferential notch, and the central recess faces the central protrusion, and the outer circumferential protrusion is formed so as to have a width larger in a direction orthogonal to a circumference direction than that of the inner circumferential protrusion.

10 Claims, 8 Drawing Sheets

(58) Field of Classification Search
CPC ............ H02K 1/146; H02K 1/16; H02K 1/18; H02K 1/182; H02K 1/185; H02K 1/187; H02K 1/06; H02K 15/022; H02K 3/522
USPC .... 310/49.29, 254.1, 126, 216.001, 216.113, 310/216.125–216.129, 216.131–216.137
See application file for complete search history.

(56) References Cited

U.S. PATENT DOCUMENTS

| | | | | |
|---|---|---|---|---|
| 5,986,377 | A * | 11/1999 | Yamada | H02K 15/06 310/216.013 |
| 6,044,737 | A * | 4/2000 | Yao | H02K 1/146 83/13 |
| 6,121,711 | A * | 9/2000 | Nakahara | H02K 3/522 310/216.096 |
| 6,226,856 | B1 * | 5/2001 | Kazama | H02K 1/12 29/596 |
| 6,452,303 | B1 * | 9/2002 | Marioni | H02K 1/148 310/254.1 |
| 6,504,284 | B1 * | 1/2003 | Kazama | H02K 1/12 310/216.016 |
| 7,199,492 | B2 * | 4/2007 | Hashimoto | H02K 41/03 310/12.25 |
| 7,348,706 | B2 * | 3/2008 | Ionel | H02K 1/148 310/216.137 |
| 7,414,347 | B2 * | 8/2008 | Wang | H02K 3/522 310/194 |
| 7,777,387 | B2 * | 8/2010 | Nagai | H02K 15/026 310/216.013 |
| 7,986,064 | B2 * | 7/2011 | Katagiri | H02K 1/185 310/43 |
| 8,413,318 | B2 * | 4/2013 | Ikeda | H02K 15/022 336/200 |
| 8,466,596 | B2 * | 6/2013 | Maki | H02K 1/148 310/216.043 |
| 8,689,427 | B2 * | 4/2014 | Bourqui | H02K 1/185 310/216.074 |
| 8,941,274 | B2 * | 1/2015 | Gianni | H02K 1/148 310/216.013 |
| 9,000,650 | B2 * | 4/2015 | Bach Andersen | H02K 1/148 310/216.008 |
| 9,306,421 | B2 * | 4/2016 | Lee | B22F 7/08 |
| 9,531,222 | B2 * | 12/2016 | Uchitani | H02K 1/165 |
| 9,634,533 | B2 * | 4/2017 | Uchitani | H02K 3/30 |
| 9,780,616 | B2 * | 10/2017 | Langford | H02K 3/345 |
| 10,128,700 | B2 * | 11/2018 | Umeda | H02K 15/022 |
| 10,291,084 | B2 * | 5/2019 | Utsumi | H02K 15/022 |
| 10,348,163 | B2 * | 7/2019 | Lin | H02K 9/227 |
| 10,673,289 | B2 * | 6/2020 | Nakagawa | H02K 15/02 |
| 10,833,542 | B2 * | 11/2020 | Ge | H02K 1/148 |
| 11,165,312 | B2 * | 11/2021 | Tokoi | H02K 1/20 |
| 2004/0104638 | A1 * | 6/2004 | Yoneda | H02K 1/148 310/216.012 |
| 2004/0164641 | A1 * | 8/2004 | Yamada | H02K 3/524 310/194 |
| 2004/0189137 | A1 * | 9/2004 | Hashimoto | H02K 1/148 310/402 |
| 2004/0256919 | A1 * | 12/2004 | Hashimoto | H02K 41/03 310/12.25 |
| 2005/0017596 | A1 * | 1/2005 | Naito | H02K 1/148 310/156.32 |
| 2005/0067912 | A1 * | 3/2005 | Murakami | H02K 1/148 310/216.043 |
| 2005/0073213 | A1 * | 4/2005 | Naito | H02K 1/148 310/156.32 |
| 2005/0125988 | A1 * | 6/2005 | Fukatsu | H02K 15/06 29/596 |
| 2005/0212378 | A1 * | 9/2005 | Wang | H02K 3/522 310/260 |
| 2006/0103263 | A1 * | 5/2006 | Naito | B60L 50/51 310/156.32 |
| 2007/0018528 | A1 * | 1/2007 | Naitou | H02K 1/148 310/43 |
| 2007/0096587 | A1 * | 5/2007 | Ionel | H02K 1/148 310/180 |
| 2007/0114875 | A1 * | 5/2007 | Lyle | H02K 3/522 310/216.004 |
| 2007/0196615 | A1 * | 8/2007 | Bach Andersen | H02K 1/148 428/57 |
| 2008/0106161 | A1 * | 5/2008 | Matsuzaki | H02K 3/524 310/194 |
| 2008/0303362 | A1 | 12/2008 | Nakajima et al. | |
| 2009/0026851 | A1 * | 1/2009 | Liou | H02K 1/148 29/598 |
| 2009/0066183 | A1 | 3/2009 | Aramaki et al. | |
| 2009/0072647 | A1 * | 3/2009 | Hino | H02K 1/276 903/906 |
| 2009/0189477 | A1 | 7/2009 | Yamamoto | |
| 2010/0001611 | A1 * | 1/2010 | Utaka | H02K 1/16 310/216.009 |
| 2010/0135830 | A1 * | 6/2010 | Yasuda | H02K 1/146 310/216.069 |
| 2010/0213785 | A1 * | 8/2010 | Nagai | H02K 1/148 310/216.043 |
| 2010/0225179 | A1 * | 9/2010 | Wang | H02K 41/031 310/12.26 |
| 2011/0101816 | A1 * | 5/2011 | Kondou | H02K 1/16 310/216.069 |
| 2011/0115314 | A1 * | 5/2011 | Du | H02K 1/14 310/50 |
| 2011/0115317 | A1 * | 5/2011 | Stark | H02K 1/148 310/71 |
| 2011/0169368 | A1 * | 7/2011 | Tsumagari | H02K 1/12 310/216.009 |
| 2011/0210640 | A1 * | 9/2011 | Elser | H02K 3/30 310/208 |
| 2011/0221297 | A1 * | 9/2011 | Langford | H02K 1/146 310/215 |
| 2012/0272512 | A1 * | 11/2012 | Uchiumi | H02K 15/0081 29/596 |
| 2013/0026878 | A1 * | 1/2013 | Feuerrohr | A23L 2/395 310/216.136 |
| 2013/0076195 | A1 * | 3/2013 | Li | H02K 29/03 310/216.097 |
| 2013/0169097 | A1 * | 7/2013 | Saban | H02K 1/278 310/152 |
| 2014/0346918 | A1 * | 11/2014 | Uchitani | H02K 1/148 29/598 |
| 2014/0361657 | A1 * | 12/2014 | Vohlgemuth | H02K 1/185 310/216.009 |
| 2015/0229177 | A1 * | 8/2015 | Langford | H02K 15/024 310/215 |
| 2015/0263572 | A1 * | 9/2015 | Hyppias | H02K 7/116 310/156.01 |
| 2015/0333577 | A1 * | 11/2015 | Jang | H02K 1/148 29/596 |
| 2015/0364954 | A1 * | 12/2015 | Senoo | H02K 1/14 310/216.009 |
| 2016/0043598 | A1 * | 2/2016 | Chang | H02K 1/14 310/254.1 |
| 2016/0099616 | A1 * | 4/2016 | Hino | H02K 1/16 310/216.043 |
| 2016/0164351 | A1 * | 6/2016 | Weiske | H02K 1/148 29/596 |
| 2016/0172921 | A1 * | 6/2016 | Yoshinori | H02K 1/165 310/215 |
| 2016/0365778 | A1 * | 12/2016 | Yu | H02K 3/345 |
| 2017/0149295 | A1 * | 5/2017 | Kawasaki | H02K 1/148 |
| 2018/0212478 | A1 * | 7/2018 | Nakamura | H02K 1/06 |
| 2019/0393739 | A1 * | 12/2019 | Seo | H02K 1/148 |
| 2020/0119600 | A1 * | 4/2020 | Inuzuka | H02K 3/34 |
| 2021/0050757 | A1 * | 2/2021 | Kitano | H02K 3/325 |

FOREIGN PATENT DOCUMENTS

| | | |
|---|---|---|
| JP | 2010119163 A | 5/2010 |
| JP | 4907654 B2 | 4/2012 |

(56) References Cited

FOREIGN PATENT DOCUMENTS

| | | | |
|---|---|---|---|
| JP | 2013208021 | A | 10/2013 |
| WO | 2006120975 | A1 | 11/2006 |
| WO | 2007141907 | A1 | 12/2007 |

* cited by examiner

(ENLARGED PART A)

FIG. 4

(ENLARGED PART B)

STATOR WITH DIVIDED CORES CONNECTED CIRCUMFERENTIALLY

RELATED APPLICATIONS

The present application is a National Phase of International Application No. PCT/JP2018/043714, filed Nov. 28, 2018, and claims priority based on Japanese Patent Application No. 2017-234907, filed Dec. 7, 2017 and Japanese Patent Application No. 2017-235136, filed Dec. 7, 2017.

TECHNICAL FIELD

The present invention relates to a stator core formed by disposing a plurality of divided cores including yoke parts and teeth parts in an annular shape, and a method for manufacturing the stator core.

BACKGROUND ART

In the past, a technique has been known in which a plurality of divided cores including yoke parts and teeth parts are disposed in an annular shape and bonded to each other to obtain a stator core. Examples of the related art documents that disclose this type of technique include, for example, the following Patent Documents 1 and 2.

The technique disclosed in Patent Document 1 is, in essence, a technique in which in a stator core configured by disposing a plurality of divided cores each including a yoke part extending in a circumferential direction and a teeth part protruding in a central direction from a central portion of the yoke part, in an annular shape, a pair of adjacent divided cores of the plurality of divided cores each include a bonding surface provided on each the yoke part and bonded to each other, and when the pair of adjacent divided cores are assembled, one of the two bonding surfaces that are bonded so as to face each other has a concave shape, and another has a convex shape, and thus the concave shape and the convex shape are combined and bonded. Note that, the invention disclosed in Patent Document 1 described below has been made for the purpose of providing a stator core capable of, at a level that a magnetic path is not affected, securing a region as wide as possible on which a winding wire can be actually wound, and increasing an amount of winding, thereby improving motor performance.

Additionally, in a technique disclosed in Patent Document 2, when assembling a divided type iron core, a concave portion and a convex portion are pressed in a laminating direction by a distance that is less than a total laminate thickness of the divided type iron core, and a press-fit force can be set to be small. As a result, it is explained that assembly workability of the divided type iron core can be improved, and assembly accuracy of the iron cores can be improved, without significantly increasing a magnetic resistance loss in a split section.

CITATION LIST

Patent Document

Patent Document 1: JP 2013-208021 A
Patent Document 2: JP 4907654 B

SUMMARY OF INVENTION

Technical Problem

However, there was room for improvement from the perspective of manufacturing and strength of the stator core in the related art represented by Patent Documents 1 and 2 described above. That is, for a stator core formed by disposing and assembling a plurality of divided cores in an annular shape, there has been a demand to achieve a stator core, while being easily manufacturable, that can obtain high strength, and a method for manufacturing the stator core.

The present invention has been made in view of the problems present in the related art described above, and an object thereof is, in a stator core formed by disposing and assembling a plurality of divided cores in an annular shape, to achieve a stator core that, while being easily manufacturable, can obtain high strength, and a method for manufacturing the stator core.

Solution to Problem

A stator core according to the present invention is a stator core configured by assembling a plurality of divided cores in an annular shape, each of the plurality of divided cores includes a yoke part extending in a circumferential direction, each the yoke part includes a first facing section and a second facing section each facing a yoke part of another adjacent divided core, the first facing section includes an inner circumferential protrusion formed on an inner circumferential side, an outer circumferential protrusion formed on an outer circumferential side, and a central recess formed between the inner circumferential protrusion and the outer circumferential protrusion, the second facing section includes an inner circumferential notch formed on the inner circumferential side, an outer circumferential notch formed on the outer circumferential side, and a central protrusion formed between the inner circumferential notch and the outer circumferential notch, in a state in which the plurality of divided cores are assembled, the inner circumferential protrusion faces the inner circumferential notch, the outer circumferential protrusion faces the outer circumferential notch, the central recess faces the central protrusion, and the outer circumferential protrusion is formed so as to have a width larger in a direction orthogonal to a circumference direction than that of the inner circumferential protrusion.

In the stator core according to the present invention, a configuration can be adopted in which, in a state in which the plurality of divided cores are assembled, the inner circumferential protrusion and the inner circumferential notch contact each other at each of the first facing section and the second facing section included in the plurality of divided cores, and at least some of positions other than the inner circumferential protrusion and the inner circumferential notch do not contact each other.

Additionally, in the stator core according to the present invention, a contact part that the inner circumferential protrusion and the inner circumferential notch contact may be constituted by a flat surface.

Furthermore, in the stator core according to the present invention, the outer circumferential protrusion may include a first end portion having a first width in a direction orthogonal to the circumference direction, and a second end portion formed so as to have a width larger than that of the first end portion.

Furthermore, in the stator core according to the present invention, a sloped part inclined diagonally with respect to the circumference direction may be formed in a portion of the outer circumferential protrusion, and a portion of the central protrusion that faces the sloped part may be formed diagonally.

A method for manufacturing a stator core according to the present invention is a method for manufacturing a stator core configured by assembling a plurality of divided cores in an annular shape, each of the plurality of divided cores includes a yoke part extending in a circumferential direction, each the yoke part includes a first facing section and a second facing section each facing a yoke part of another adjacent divided core, the first facing section includes an inner circumferential protrusion formed on an inner circumferential side, an outer circumferential protrusion formed on an outer circumferential side, and a central recess formed between the inner circumferential protrusion and the outer circumferential protrusion, the second facing section includes an inner circumferential notch formed on the inner circumferential side, an outer circumferential notch formed on the outer circumferential side, and a central protrusion formed between the inner circumferential notch and the outer circumferential notch, the plurality of divided cores are assembled such that the inner circumferential protrusion faces the inner circumferential notch, the outer circumferential protrusion faces the outer circumferential notch, and the central recess faces the central protrusion, and the outer circumferential protrusion is formed so as to have a width larger in a direction orthogonal to a circumference direction than that of the inner circumferential protrusion.

Advantageous Effects of Invention

According to the present invention, in a stator core formed by disposing and assembling a plurality of divided cores in an annular shape, it is possible to achieve a stator core that can, while being easily manufacturable, obtain high strength, and a method for manufacturing the stator core.

BRIEF DESCRIPTION OF DRAWINGS

FIGS. 1A and 1B are diagrams for explaining a basic configuration and a method for manufacturing the stator core according to the present embodiment, FIG. 1A illustrates a state before assembly of the stator core in which a plurality of divided cores are disposed in an annular shape, and FIG. 1B illustrates a state in which the plurality of divided cores disposed in the annular shape are assembled.

DESCRIPTION OF EMBODIMENTS

A preferred embodiment for implementing the present invention will be described below with reference to the drawings. Note that, the following embodiment is not limited to a contrivance according to each of the claims, and all of combinations of features described in the embodiments are not necessary to a solution means of a contrivance.

Figure 1A:
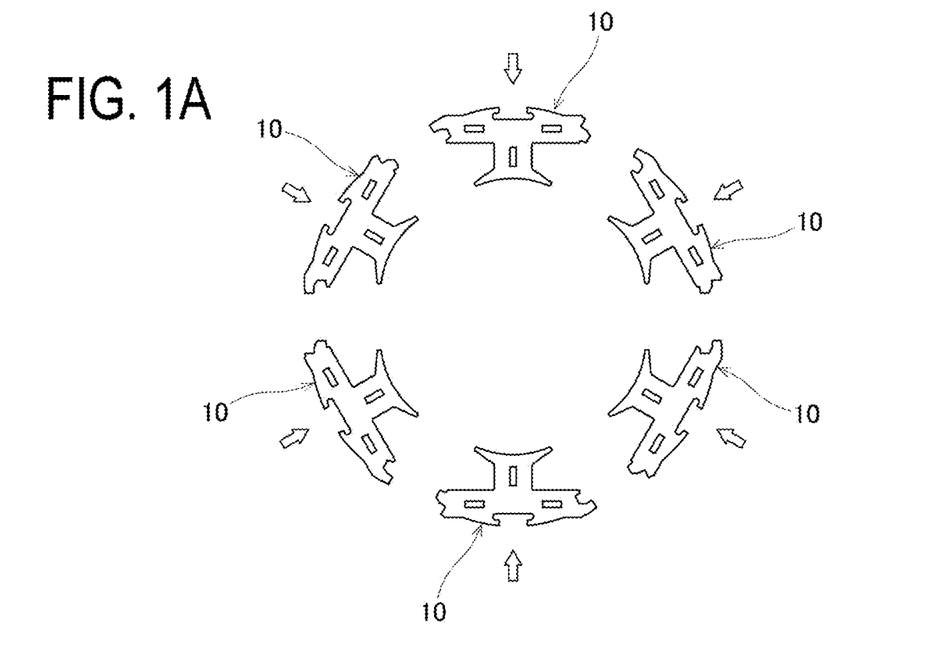
Figure 1B:
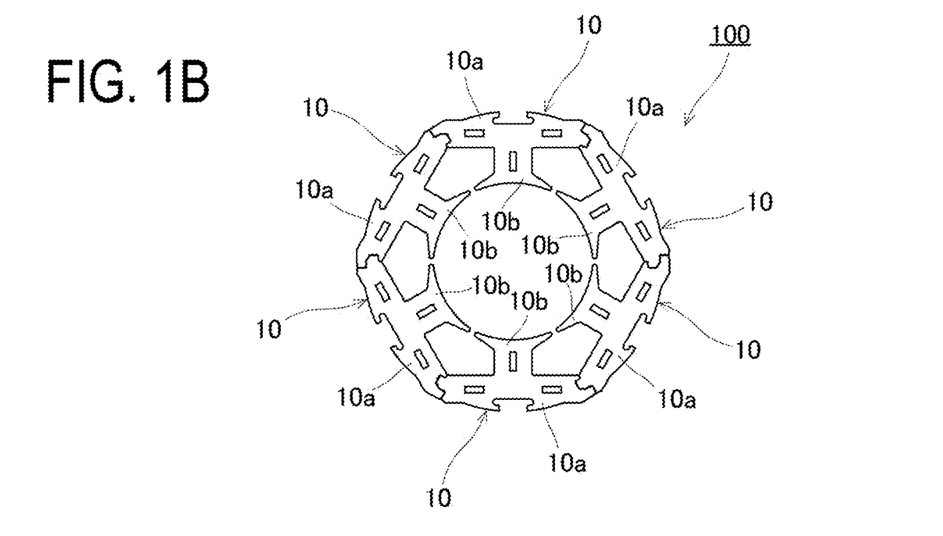

First, a basic configuration and a manufacturing method of a stator core according to the present embodiment will be described using FIGS. 1A, 1B, and FIG. 2. Here, FIGS. 1A and 1B are diagrams for explaining the basic configuration and the manufacturing method of the stator core according to the present embodiment, FIG. 1A illustrates a state before assembly of the stator core in which a plurality of divided cores are disposed in an annular shape, and FIG. 1B illustrates a state in which the plurality of divided cores disposed in the annular shape are assembled. Note that, FIGS. 1A and 1B are diagrams each illustrating a state in which the plurality of divided cores are disposed on a plane orthogonal to a rotor axis (not illustrated). Further, FIG. 2 is an exterior perspective view illustrating an overall configuration of the divided core.

As illustrated in FIGS. 1A and 1B, a stator core 100 according to the present embodiment is a member formed by assembling six divided cores 10. As illustrated in FIG. 2, each of the divided cores 10 is formed by preparing a thin sheet member 11 having a planar shape of the divided core 10 by punching a silicon sheet or the like in a pressing process or the like, piling up and laminating the thin sheet members 11, and integrally bonding the thin sheet members 11 by laser welding or the like. The divided core 10 manufactured in this manner, in a case viewing in a positional relationship when assembled into the stator core 100, is configured by including a yoke part 10a extending in a circumferential direction, and a teeth part 10b protruding in a central direction from a central portion of the yoke part 10a.

Figure 2:
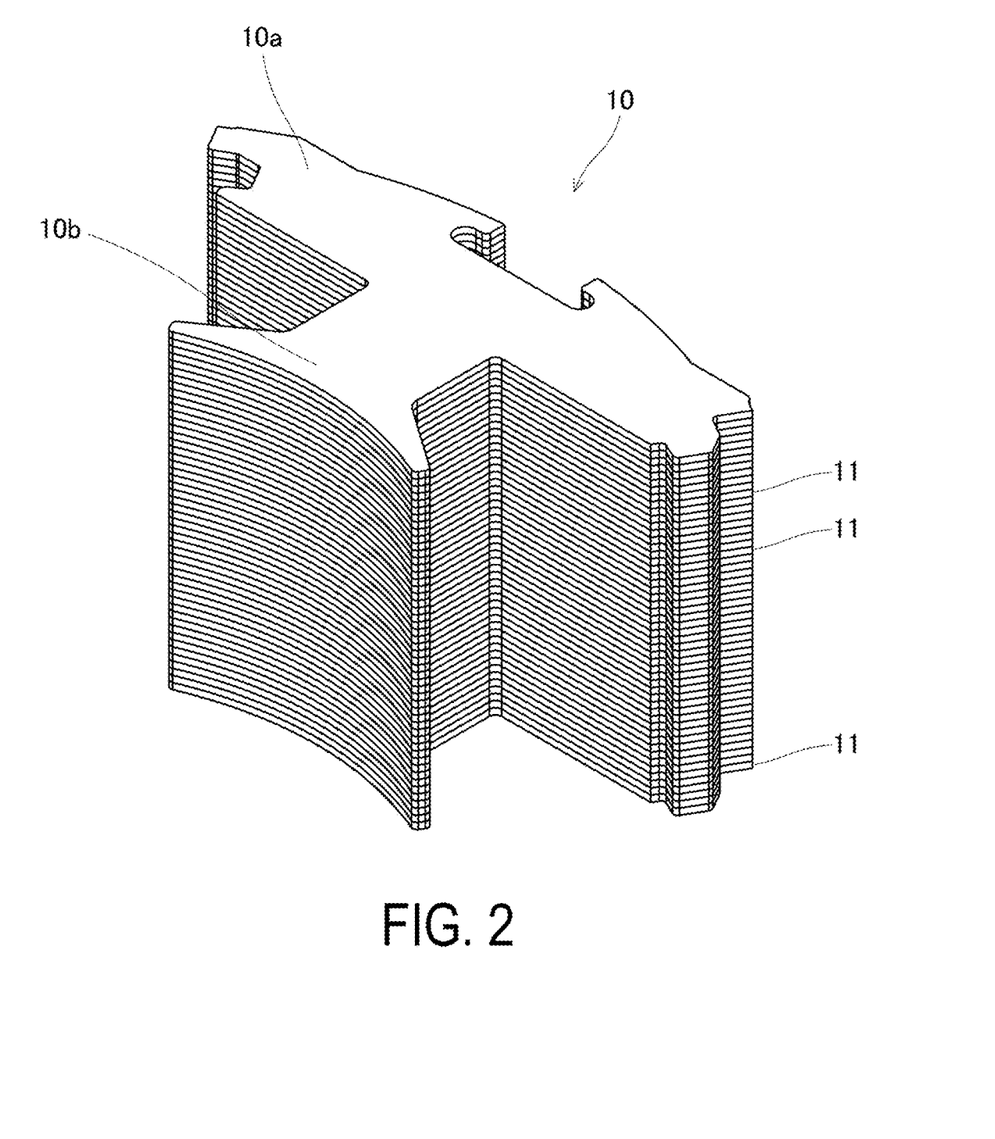
FIG. 2 is an exterior perspective view illustrating an overall configuration of the divided core.

In the divided core 10, from a state illustrated in FIG. 2, a coil (not illustrated) is wounded around the teeth part 10b. Then, the divided cores 10 each wound with the coil (not illustrated) are disposed in the annular shape, as illustrated in FIG. 1A. The six divided cores 10 disposed in the annular shape are formed in a shape of the stator core 100 as illustrated in FIG. 1B, by simultaneously bringing close the six divided cores 10 in a central direction of the rotor axis (that is, an arrow direction illustrated in FIG. 1A) on a plane orthogonal to the rotor axis (not illustrated). From this state, the six divided cores 10 are integrally bonded to each other by laser welding or the like to complete the stator core 100 according to the present embodiment. Note that, the process of simultaneously bringing close the six divided cores 10 and integrally bonding each other by laser welding or the like may be performed automatically by manufacturing equipment such as an assembly machine, an assembly robot, or the like.

Figure 3:
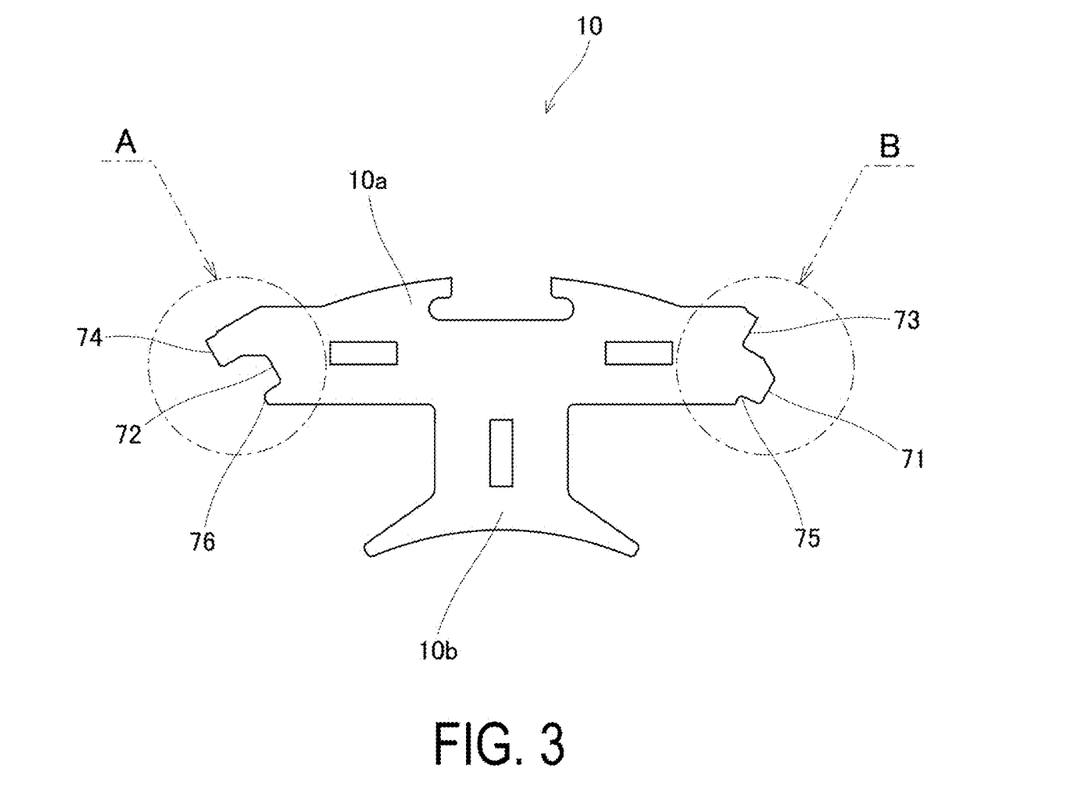
FIG. 3 is a plan view for explaining a shape of the divided core according to the present embodiment.
Figure 4:
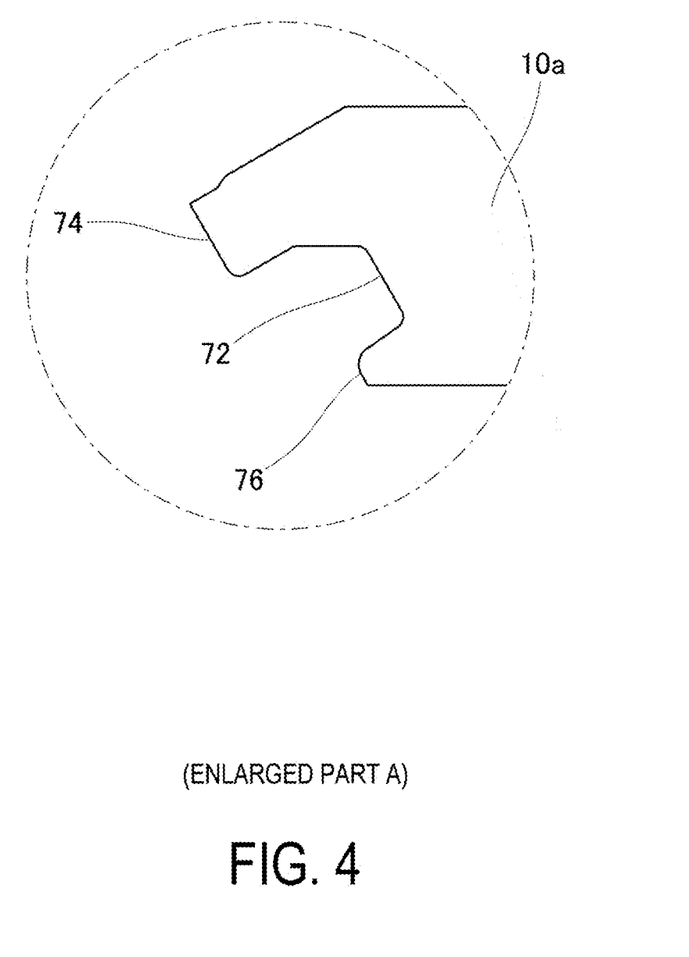
FIG. 4 is an enlarged view of a position indicated by a reference sign A in FIG. 3.
Figure 5:
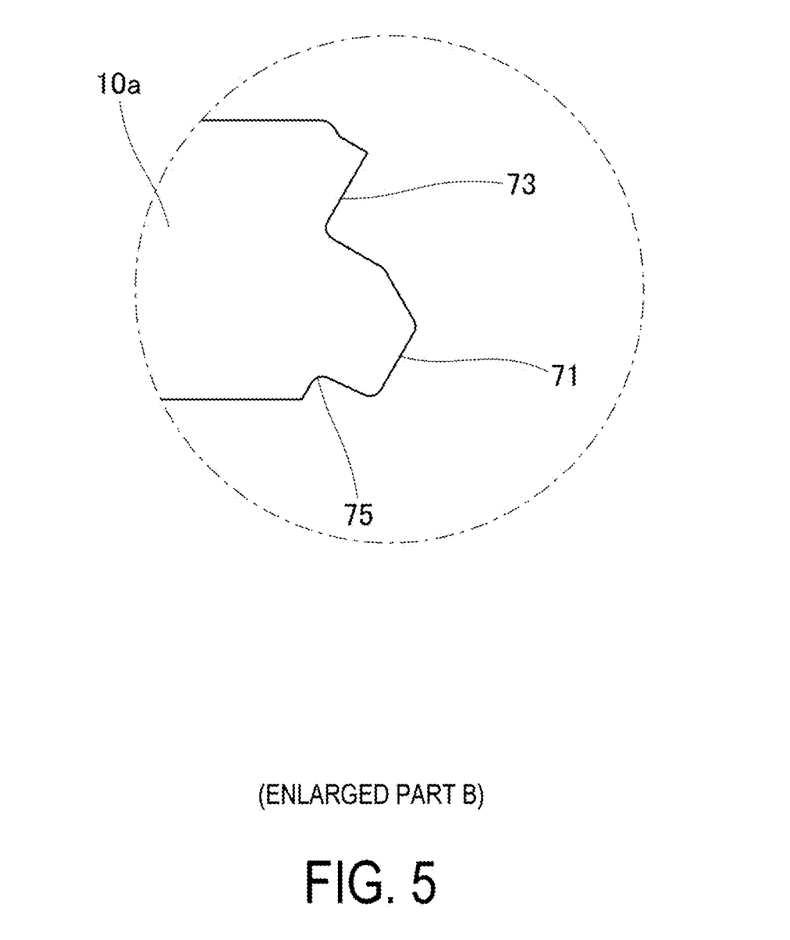
FIG. 5 is an enlarged view of a position indicated by a reference sign B in FIG. 3.

The stator core 100 manufactured according to the procedure described above has a significant formal configuration compared to the related art. Thus, by adding FIG. 3 to FIG. 7 to the reference drawings, a more specific configuration of the stator core 100 according to the present embodiment, and the divided core 10 that composes the stator core 100 will be described. Here, FIG. 3 is a plan view for explaining a shape of the divided core according to the present embodiment. Further, FIG. 4 is an enlarged view of a position indicated by the reference sign A in FIG. 3, and FIG. 5 is an enlarged view of a position indicated by the reference sign B in FIG. 3. Furthermore, FIG. 6 is a plan view of the stator core formed by assembling the six divided cores, and FIG. 7 is a main portion enlarged view in which a main portion of the stator core illustrated in FIG. 6 is enlarged.

As illustrated in FIG. 3 to FIG. 5, both end portions of the yoke part 10a of the divided core 10 according to the present embodiment are configured as two bonding surfaces such that each the end portion can be bonded to an end portion of the yoke parts 10a of the divided core 10 being adjacent. Furthermore, these two bonding surfaces are configured as a first facing section A and a second facing section B according to the present invention, respectively. For example, in the divided core 10 according to the present embodiment illustrated in FIG. 3, the second facing section B that is an end portion of the yoke part 10a on a right side of a paper surface, and the first facing section A that is an end portion on a left side of the paper surface, have different shapes from each other respectively, and are configured as bonding surfaces in each of which both the end portions have respective shapes that enable bonding of the second facing section B that is the end portion of the yoke part 10a on the right side of the paper surface, and the first facing section A that is the end portion of the yoke part 10a on the left side of the paper surface to each other (see FIG. 7 and the like).

Figure 6:
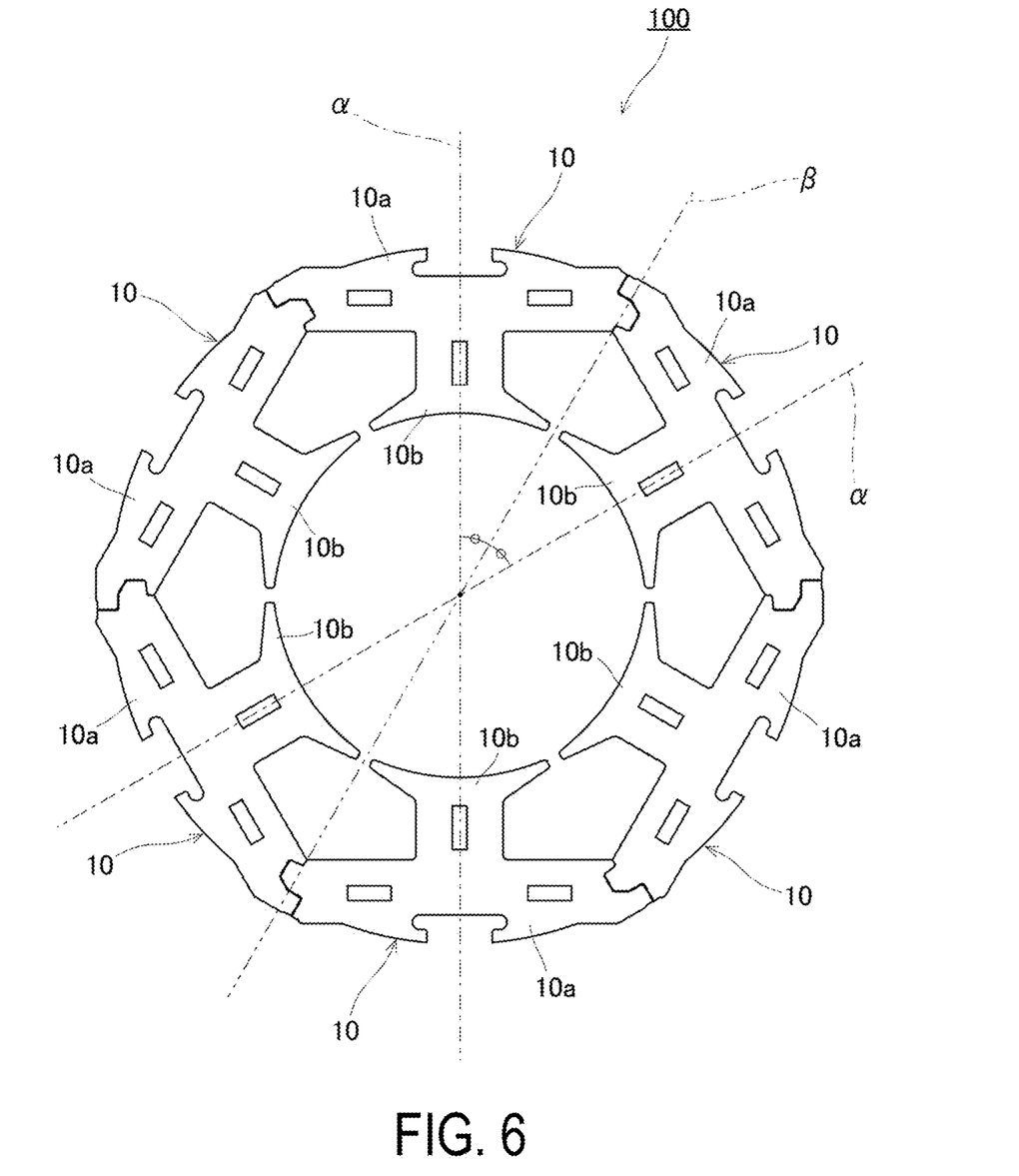
FIG. 6 is a plan view of the stator core formed by assembling six number of the divided cores.
Figure 7:
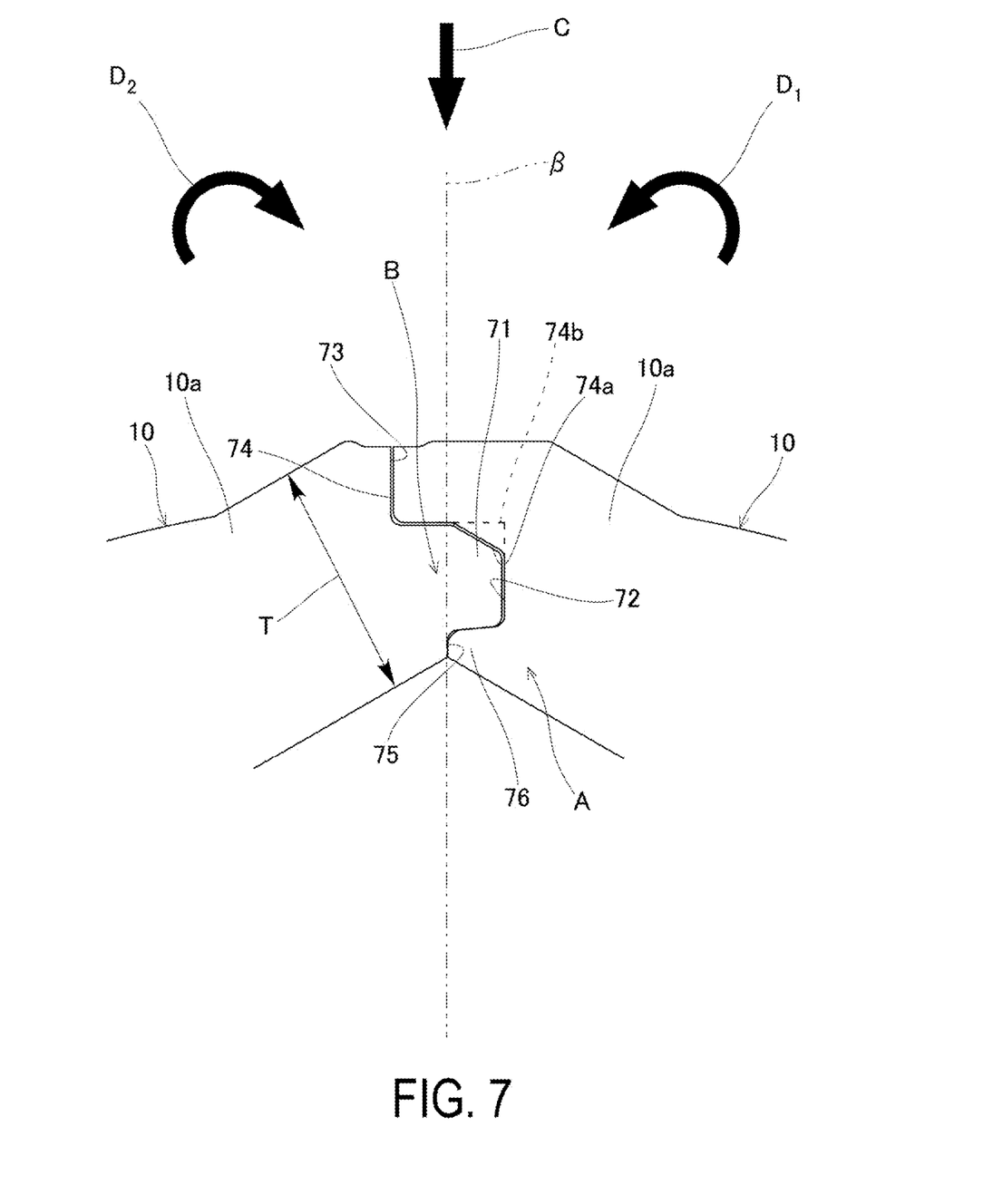
FIG. 7 is a main portion enlarged view in which a main portion of the stator core illustrated in FIG. 6 is enlarged.

In addition, as illustrated in FIG. 6 and FIG. 7, when a pair of the divided cores 10 being adjacent to each other are assembled, the divided core 10 according to the present embodiment is configured to have a convex and concave shape formed in a direction orthogonal to a bisector (3, for the two bonding surfaces (first facing section A and second facing section B) that are bonded so as to face each other, in a case the bisector β of an angle formed by respective center lines a of the teeth parts 10b of the pair of divided cores 10 is assumed. In other words, in the example illustrated in FIG. 7, the bonding surface is formed as a concave shape in the end portion (first facing section A) of the yoke part 10a of the divided core 10 disposed on the right side of the paper surface, and the bonding surface is formed as a convex shape in the end portion (second facing section B) of the yoke part 10a of the divided core 10 disposed on the left side of the paper surface.

The concave shape formed in the end portion (first facing section A) of the yoke part 10a of the divided core 10 disposed on the right side of the paper surface in FIG. 7 is configured by including an inner circumferential protrusion 76 formed on an inner circumferential side of the first facing section A that is the bonding surface, an outer circumferential protrusion 74 formed on an outer circumferential side of the bonding surface, and a central recess 72 formed between the inner circumferential protrusion 76 and the outer circumferential protrusion 74. On the other hand, the convex shape formed in the end portion (second facing section B) of the yoke part 10a of the divided core 10 disposed on the left side of the paper surface in FIG. 7 is configured by including an inner circumferential notch 75 formed corresponding to the inner circumferential protrusion 76 included in the concave shape of the first facing section A, an outer circumferential notch 73 formed corresponding to the outer circumferential protrusion 74 included in the concave shape of the first facing section A, and a central protrusion 71 formed between the inner circumferential notch 75 and the outer circumferential notch 73. Note that, the central recess 72 included in the concave shape of the first facing section A and the central protrusion 71 included in the convex shape of the second facing section B are formed to have respective outer contours that enable mutual assembly. The concave shape and the convex shape that constitute the first facing section A and the second facing section B respectively that are the two bonding surfaces disposed so as to face each other, are assembled and bonded to each other so as to bond the divided cores 10 to each other.

Furthermore, the convex and concave shape configured by combining the convex shape and the concave shape is configured so as to protrude or be recessed in the direction orthogonal to the bisector β. More specifically, as illustrated in FIG. 7, the central protrusion 71 forming the convex shape of the divided core 10 disposed on the left side of the paper surface is configured to protrude in the direction orthogonal to the bisector β. Further, the central recess 72 forming the concave shape of the divided core 10 disposed on the right side of the paper surface in FIG. 7 is configured to be recessed in the direction orthogonal to the bisector β. Such a configuration achieves reliable bonding of the two bonding surfaces to be bonded so as to face each other without friction when the six divided cores 10 are brought close simultaneously.

In addition, as illustrated in FIG. 6 and FIG. 7, when the adjacent pair of the divided cores 10 are assembled, the divided core 10 according to the present embodiment is configured to further have a planar shape formed in a direction parallel to the bisector β, for each of the two bonding surfaces (first facing section A and second facing section B) that are bonded so as to face each other. In other words, in the example illustrated in FIG. 7, the outer circumferential notch 73 and the outer circumferential protrusion 74 disposed on the outer circumferential side of the bonding surface are formed as planar shapes in the direction parallel to the bisector β. Also, in the example illustrated in FIG. 7, a part of surface on the inner circumferential side of each of the central protrusion 71 and the central recess 72 disposed on a central side of the bonding surface is formed as a planar shape in the direction parallel to the bisector β. Furthermore, in the example illustrated in FIG. 7, each of a notch surface of the inner circumferential notch 75 and a tip surface of the inner circumferential protrusion 76 disposed on the inner circumferential side of the bonding surface is formed as a planar shape in the direction parallel to the bisector β. Since the divided core 10 according to the present embodiment has the planar shape described above, it is possible to reliably make the divided cores 10 that are easily combined and adjacent to each other contact each other.

In addition, as illustrated in FIG. 6 and FIG. 7, when the adjacent pair of the divided cores 10 are assembled, the divided core 10 according to the present embodiment is configured such that, for the two bonding surfaces (first facing section A and second facing section B) that are bonded so as to face each other, the inner circumferential protrusion 76 and the inner circumferential notch 75 that are respective contact parts on the inner circumferential side of the bonding surface have a wedge shape. In other words, in the example illustrated in FIG. 7, the wedge shape is formed on the inner circumferential side of each of the first facing section A and the second facing section B being the bonding surfaces, and as a site that forms this wedge shape, the inner circumferential notch 75 is formed as a wedge concave shape portion in the second facing section B that is the end portion of the yoke part 10a of the divided core 10 disposed on the left side of the paper surface, or the inner circumferential protrusion 76 is formed as a wedge convex shape portion in the first facing section A that is the end portion of the yoke part 10a of the divided core 10 disposed on the right side of the paper surface.

Note that, in the divided core 10 according to the present embodiment, a configuration is adopted in which, when the six divided cores 10 disposed in the annular shape are simultaneously brought close in the central direction of the rotor axis (that is, the arrow direction illustrated in FIG. 1A), the bonding surfaces (first facing section A and second facing section B) each formed in the end portion of the yoke part 10a during a bonding operation do not frictionally contact each other, and only the inner circumferential notch 75 and the inner circumferential protrusion 76 that constitute the wedge shape contact each other just before completion of the bonding. Then, when the pair of adjacent divided cores 10 are assembled, the two bonding surfaces (first facing section A and second facing section B) that are bonded so as to face each other are configured such that positions other than the inner circumferential notch 75 and the inner circumferential protrusion 76 that are the respective contact parts configured in the wedge shape are each adjacent to a gap, so the bonding surfaces each formed in the end portion of the yoke part 10a will not be mutually rubbed. Thus, a configuration is obtained in which failure such as deformation is unlikely to occur, and assemblability is excellent.

In addition, a configuration is adopted in which, in the two bonding surfaces that are bonded so as to face each other, the outer circumferential protrusion 74 that forms the concave shape is formed to have a larger thickness than that of the inner circumferential protrusion 76 that also forms the concave shape. In other words, the outer circumferential protrusion 74 according to the present embodiment has a formal characteristic that a width in a direction orthogonal to a circumference direction is formed to be larger than that of the inner circumferential protrusion 76. Adopting such a configuration is to improve strength of the stator core 100, and specifically, as illustrated in FIG. 7, when external force is applied to a joint between the divided cores 10 constituting the stator core 100 from the outer circumferential side toward the inner circumferential side as indicated by a reference sign C, force in a direction in which the divided cores 10 are opened, as indicated by reference signs $D_1$ and $D_2$, is applied to the divided cores 10. In order to withstand the effects of the force in the direction described above, by forming the outer circumferential protrusion 74 to have a larger thickness than that of the inner circumferential protrusion 76, the strength of the stator core 100 can be improved, deformation can be prevented when a load is applied, and the strength of the stator core 100 can be improved.

In addition, in the two bonding surfaces that are bonded so as to face each other, a sloped part 74a that protrudes toward a side of the central recess 72 is formed in the outer circumferential protrusion 74 included in the concave shape, such that a thickness increases toward a base portion of a protruding portion that is a base end portion (see FIG. 7). That is, the outer circumferential protrusion 74 according to the present embodiment is configured to include a first end portion having a first width in the direction orthogonal to the circumference direction and a second end portion formed to have a width larger than that of the first end portion, and a configuration is adopted in which the first end portion forms a distal end side of the outer circumferential protrusion 74, and the second end portion forms the base portion of the protruding portion that is the base end portion. As described above, the presence of the sloped part 74a inclined diagonally with respect to the circumference direction is preferable because strength can be improved, for example, compared to a case where the outer circumferential protrusion 74 is formed with a simple rectangular shape, such as a dashed line indicated by a reference sign 74b in FIG. 7. Note that, it is sufficient that, as a shape of a tip portion on the outer circumferential side of the central protrusion 71 disposed so as to face the outer circumferential protrusion 74 in which the inclined portion 74a is formed, a sloped cutout shape corresponding to the sloped part 74a is adopted.

In addition, as described above, in the present embodiment, a configuration is adopted in which, in the two bonding surfaces that are bonded so as to face each other, the outer circumferential protrusion 74 that forms the concave shape is formed to have a larger thickness than the inner circumferential protrusion 76 that also forms the concave shape. By adopting this configuration, a position where the central protrusion 71 forming the convex shape is disposed is configured so as to be a position biased toward the inner circumferential side with respect to a length dimension T in a thickness direction of the divided core 10. By adopting various configurations described above including such a configuration, the stator core 100 according to the present embodiment is constituted as a stator core having improved strength.

Figure 8:
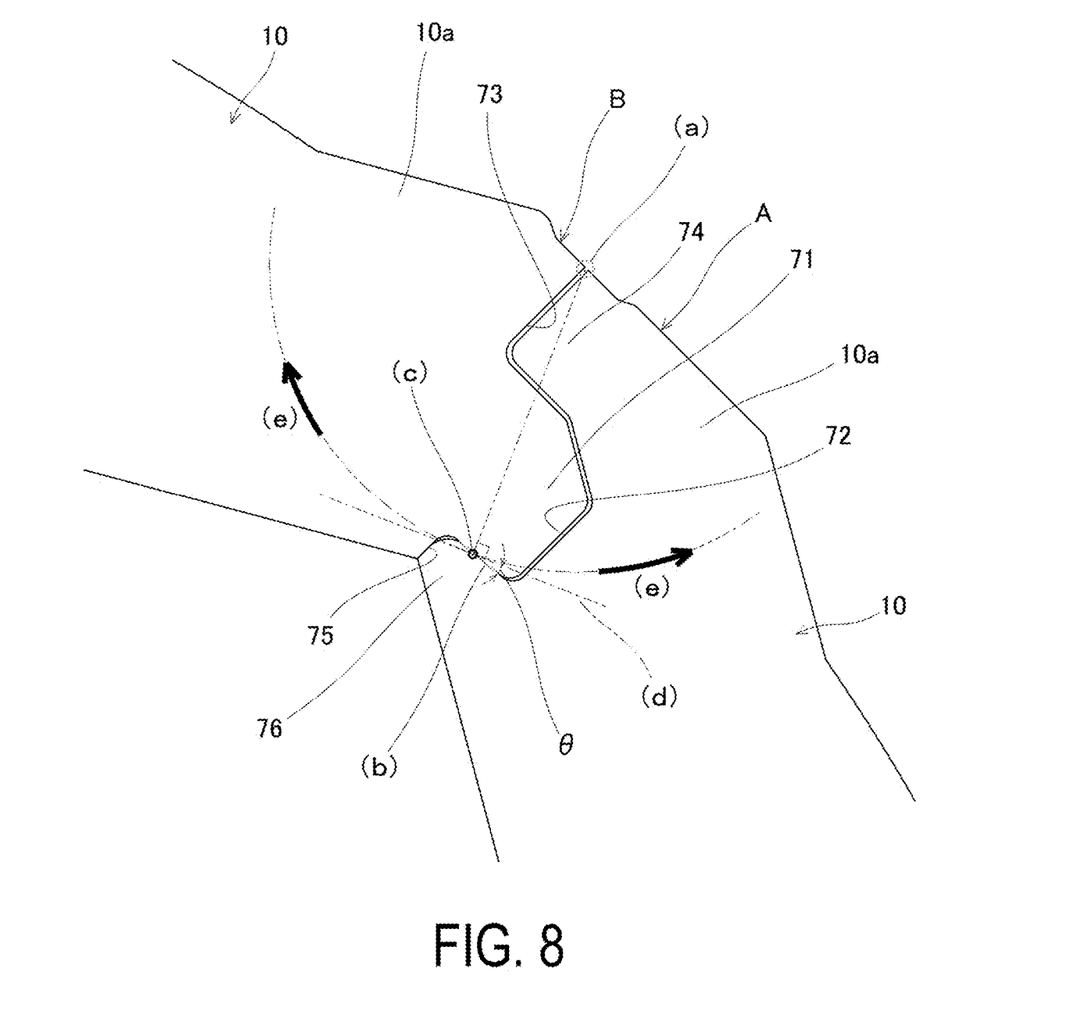
FIG. 8 is a diagram for explaining formal characteristics and effects inherent in an inner circumferential protrusion and an inner circumferential notch as a wedge shape formed in a first facing section and a second facing section respectively, that are bonding surfaces of the divided core according to the present embodiment.

Note that, the wedge shape formed on each of the bonding surfaces (first facing section A and second facing section B) of the divided core 10 according to the present embodiment is provided with additional significant formal characteristics and effects. Here, FIG. 8 is a diagram for explaining formal characteristics and effects inherent in the inner circumferential protrusion and the inner circumferential notch as the wedge shape formed in the first facing section and the second facing section respectively, that are each the bonding surface of the divided core according to the present embodiment. As illustrated in FIG. 8, in a plan view of the divided cores 10 adjacent to each other, when a pair of the adjacent divided cores 10 are assembled, the first facing section A and the second facing section B that are the two bonding surfaces that are to be bonded so as to face each other, are welded to each other defining a position indicated by a reference sign (a) on the outer circumferential side as a welding point. In addition, a line segment forming a bonding surface in a wedge shape that the inner circumferential notch 75 and the inner circumferential protrusion 76 contact is referred to as a wedge-shaped bonding surface (b), and an arbitrary point (c) is set on the line segment of the wedge-shaped bonding surface (b). Then, the welding point (a) is defined as a central point, a virtual arc having a radius that is a virtual line that connects the welding point (a) and the point (c) set on the line segment of the wedge-shaped bonding surface (b) is set, and a tangential component of the virtual arc drawn on the point (c) is set as a tangent line (d). When such a relationship is set, in the wedge shape formed on the bonding surface of the divided core 10 according to the present embodiment, the wedge-shaped bonding surface (b) and the tangent line (d) are configured to form an angle θ, thus it is possible to obtain a propping effect on force in a direction indicated by a reference sign (e) with the welding point (a) as the central point. In other words, even when external force acting in a direction in which the inner circumferential notch 75 and the inner circumferential protrusion 76 are separated from each other about the welding point (a), the separation can be prevented by the wedge-shaped bonding surface (b). The stator core 100 for which failure such as deformation is unlikely to occur is realized, by the propping effect exerted based on such a formal characteristic inherent in the wedge shape.

Furthermore, in the two bonding surfaces (first facing section A and second facing section B) that are bonded so as to face each other, the gaps formed at positions other than the inner circumferential notch 75 and the inner circumferential protrusion 76 that are the contact parts configured in the wedge shape, are preferably configured to have a uniform dimension. Furthermore, when the gap dimension is too large, an action of inhibiting a magnetic flux flow works, on the other hand, when the gap dimension is too small, positions other than the wedge shape contact each other during assembly, thereby inhibiting assemblability. Thus, it is preferable to set the gap dimensions with dimensional accuracy that satisfies the above-described two conditions that a magnetic flux flow is not inhibited and assemblability is not inhibited.

The stator core 100 according to the present embodiment formed by assembling the divided cores 10 having the various formal characteristics described above is configured as an unprecedent stator core that, while being easily manufacturable, can obtain high strength.

The preferred embodiment of the present invention has been described above, but the technical scope of the present invention is not limited to the scope described in the above embodiment. Various modifications or improvements can be made to the above embodiment.

For example, in the embodiment described above, when the pair of the adjacent divided cores 10 are assembled, the first facing section A and the second facing section B that are the two bonding surfaces that are bonded so as to face each other are configured such that each of the inner circumferential notch 75 and the inner circumferential protrusion 76 that are the contact part on the inner circumferential side of the bonding surface has the wedge shape. However, the location on which of the wedge shape is formed is not limited to the inner circumferential side of the bonding surface. In the present invention, it is also possible to form a wedge shape in a central portion of a bonding surface.

Furthermore, in the embodiment described above, in the two bonding surfaces (first facing section A and second facing section B) that are bonded so as to face each other, the gaps formed at positions other than the inner circumferential notch 75 and the inner circumferential protrusion 76 that are the contact parts configured in the wedge shape, are configured to have a uniform dimension. However, the gap dimensions need not be uniform at all sites, and may be formed such that, in order not to inhibit a magnetic flux flow flowing in the direction orthogonal to the bisector β illustrated in FIG. 7, a gap between the outer circumferential notch 73 and the outer circumferential protrusion 74 that are surfaces in a parallel direction to the bisector β, or a gap between a tip portion of the central protrusion 71 and a bottom surface portion of the central recess 72 is made as narrow as possible, and the other gap dimensions are formed so as to be slightly larger. Even when such a modified configuration is adopted, similar effects to those of the embodiment described above can be obtained.

Further, for example, in the method for manufacturing the stator core 100 according to the embodiment described above, for the six divided cores 10 disposed in the annular shape, a method is assumed in which the shape of the stator core 100 as illustrated in FIG. 1B is obtained, by simultaneously bringing close the six divided cores 10 in the central direction of the rotor axis (that is, the arrow direction illustrated in FIG. 1A) on the plane orthogonal to the rotor axis (not illustrated). However, with the method for manufacturing the stator core according to the present invention, in addition to the method assumed in the embodiment described above, it is possible to adopt a manufacturing method in which the plurality of divided cores 10 are moved in the rotor axis direction and bonded to each other, and it is possible to apply the present invention to the stator core manufactured according to such a manufacturing method.

It is apparent from the description of the claims that such modified or improved forms may also be included within the technical scope of the present invention.

INDUSTRIAL APPLICABILITY

The stator core of the present invention has high strength while being easily manufacturable, and therefore has industrial applicability, for example, as a component of a rotating electrical machine such as a motor used in an electric tool.

REFERENCE SIGNS LIST

100 Stator core
10 Divided core
10a Yoke part
10b Teeth part
11 Thin sheet member
71 Central protrusion
72 Central recess
73 Outer circumferential notch
74 Outer circumferential protrusion
74a Sloped part
75 Inner circumferential notch
76 Inner circumferential protrusion
A First facing section
B Second facing section
α Central line (of teeth part)
β Bisector (of angle formed by central lines of adjacent teeth parts)
T Length dimension in thickness direction of divided core
(a) Welding point
(b) Wedge-shaped bonding surface
(c) (Any) point (on line segment of wedge-shaped bonding surface)
(d) Tangent line

The invention claimed is:
1. A stator core comprising:
a plurality of divided cores assembled in an annular shape, wherein
each of the plurality of divided cores includes a yoke part extending in a circumferential direction and a teeth part protruding in a direction orthogonal to the circumferential direction from a central portion of the yoke part,
each the yoke part includes a first bonding surface and a second bonding surface facing the first bonding surface of the yoke part of another adjacent divided core of the plurality of divided cores,
the first bonding surface includes
an inner circumferential protrusion formed on an inner circumferential side,
an outer circumferential protrusion formed on an outer circumferential side, and
a central recess formed between the inner circumferential protrusion and the outer circumferential protrusion,
the second bonding surface includes
an inner circumferential notch formed on the inner circumferential side,
an outer circumferential notch formed on the outer circumferential side, and
a central protrusion formed between the inner circumferential notch and the outer circumferential notch,
in an assembled state of the plurality of divided cores, the inner circumferential protrusion faces the inner circumferential notch, the outer circumferential pro- trusion faces the outer circumferential notch, and the central recess faces the central protrusion, the outer circumferential protrusion has a width larger in the direction orthogonal to the circumferential direction than that of the inner circumferential protrusion, a welding point is located at an edge portion on the outer circumferential side of the first bonding surface, and the first bonding surface is welded to the second bonding surface at the welding point, wherein a bisector of an angle is formed by a center line of each the teeth part of a pair of the plurality of divided cores, the outer circumferential protrusion and the outer circumferential notch comprise planar shapes in a direction parallel to the bisector, and the welding point is located apart from the bisector in the circumferential direction.

2. The stator core according to claim 1, wherein the outer circumferential protrusion includes
a first end portion having a first width in a direction orthogonal to the circumference direction, and
a second end portion formed so as to have a width larger than that of the first end portion.

3. The stator core according to claim 1, wherein
a sloped part inclined diagonally with respect to the circumference direction is formed in a portion of the outer circumferential protrusion, and a portion of the central protrusion that faces the sloped part is formed diagonally.

4. The stator core according to claim 1, wherein
in a state in which the plurality of divided cores are assembled, the inner circumferential protrusion and the inner circumferential notch contact each other at each of the first bonding surface and the second bonding surface that the plurality of divided cores include, and at least some of positions other than the inner circumferential protrusion and the inner circumferential notch do not contact each other.

5. The stator core according to claim 4, wherein
a contact part that the inner circumferential protrusion and the inner circumferential notch contact is constituted by a flat surface.

6. The stator core according to claim 1, wherein
the welding point of each of the plurality of divided cores is located farther outwardly than the bisector in the circumferential direction from each the teeth part of the plurality of divided cores.

7. The stator core according to claim 6, wherein
the bisector is located on the inner circumferential protrusion of the first bonding surface.

8. A stator core comprising:
a plurality of divided cores assembled in an annular shape, wherein
each of the plurality of divided cores includes a yoke part extending in a circumferential direction and a teeth part protruding in a direction orthogonal to the circumference direction from a central portion of the yoke part,
each the yoke part includes
a first bonding surface,
a second bonding surface facing the first bonding surface of the yoke part of another adjacent divided core of the plurality of divided cores,
an inner circumferential surface located between the first bonding surface and the second bonding surface and connected to the teeth part, and
an outer circumferential surface located between the first bonding surface and the second bonding surface and opposed to the inner circumferential surface, the first bonding surface includes
an inner circumferential protrusion formed on an inner circumferential side,
an outer circumferential protrusion formed on an outer circumferential side, and
a central recess formed between the inner circumferential protrusion and the outer circumferential protrusion,
the second bonding surface includes
an inner circumferential notch formed on the inner circumferential side,
an outer circumferential notch formed on the outer circumferential side, and
a central protrusion formed between the inner circumferential notch and the outer circumferential notch,
the outer circumferential surface includes
a first portion comprising a circular-arc shape along the circumferential direction,
a second portion located farther outwardly than the first portion in the circumferential direction and protruding toward the outer circumferential side,
in an assembled state of the plurality of divided cores, the inner circumferential protrusion faces the inner circumferential notch, the outer circumferential protrusion faces the outer circumferential notch, and the central recess faces the central protrusion, and
the outer circumferential protrusion has a width larger in the direction orthogonal to the circumference direction than that of the inner circumferential protrusion.

9. The stator core according claim 8, wherein
the second portion is connected to the first portion,
a boundary of the first portion and the second portion is located farther inwardly than a whole of the central recess in the circumferential direction.

10. A stator core comprising:
a plurality of divided cores assembled in an annular shape, wherein
each of the plurality of divided cores includes a yoke part extending in a circumferential direction,
each the yoke part includes
a first bonding surface,
a second bonding surface facing the first bonding surface of the yoke part of another adjacent divided core of the plurality of divided cores,
an inner circumferential surface located between the first bonding surface and the second bonding surface and connected to the teeth part, and
an outer circumferential surface located between the first bonding surface and the second bonding surface and opposed to the inner circumferential surface, the first bonding surface includes
an inner circumferential protrusion formed on an inner circumferential side,
an outer circumferential protrusion formed on an outer circumferential side, and
a central recess formed between the inner circumferential protrusion and the outer circumferential protrusion,
the second bonding surface includes
an inner circumferential notch formed on the inner circumferential side,
an outer circumferential notch formed on the outer circumferential side, and a central protrusion formed between the inner circumferential notch and the outer circumferential notch, the inner circumferential surface is connected to the inner circumferential protrusion of the first bonding surface, the outer circumferential surface is connected to the outer circumferential protrusion of the first bonding surface, in an assembled state of the plurality of divided cores, the inner circumferential protrusion faces the inner circumferential notch, the outer circumferential protrusion faces the outer circumferential notch, and the central recess faces the central protrusion, and the outer circumferential protrusion has a width larger in the direction orthogonal to the circumference direction than that of the inner circumferential protrusion.

\* \* \* \* \*